United States Patent
Magnusson et al.

(10) Patent No.: US 12,269,251 B2
(45) Date of Patent: Apr. 8, 2025

(54) FLOOR AND WALL PANEL SYSTEM

(71) Applicant: THORHAMMER, LLC, Hortonville, WI (US)

(72) Inventors: Tryggvi Magnusson, Hortonville, WI (US); Natalie A. Magnusson, Schofield, WI (US)

(73) Assignee: Thorhammer, LLC., Hortonville, WI (US)

( * ) Notice: Subject to any disclaimer, the term of this patent is extended or adjusted under 35 U.S.C. 154(b) by 685 days.

(21) Appl. No.: 17/458,823

(22) Filed: Aug. 27, 2021

(65) Prior Publication Data
US 2022/0048276 A1 Feb. 17, 2022

Related U.S. Application Data

(63) Continuation-in-part of application No. 17/086,657, filed on Nov. 2, 2020.
(Continued)

(51) Int. Cl.
*B32B 7/12* (2006.01)
*B32B 3/30* (2006.01)
(Continued)

(52) U.S. Cl.
CPC ............... *B32B 7/12* (2013.01); *B32B 3/30* (2013.01); *E04F 13/0866* (2013.01);
(Continued)

(58) Field of Classification Search
CPC ....... B32B 3/06; B32B 37/16; B32B 2419/04; B32B 7/12; B32B 3/30; E04F 15/02155;
(Continued)

(56) References Cited

U.S. PATENT DOCUMENTS

| | | | |
|---|---|---|---|
| 871,420 A | * 11/1907 | Kohout et al. | ...... E04F 13/0862 52/384 |
| 1,661,037 A | * 2/1928 | Gammeter | ................ E01C 5/18 52/390 |

(Continued)

FOREIGN PATENT DOCUMENTS

| | | |
|---|---|---|
| DE | 102005024437 | 11/2006 |
| KR | 100444279 | 8/2004 |

(Continued)

*Primary Examiner* — Brian E Glessner
*Assistant Examiner* — Adam G Barlow
(74) *Attorney, Agent, or Firm* — Boyle Fredrickson, S.C.

(57) ABSTRACT

A decorative wall system is provided that includes a number of panels that can be secured to an underlying wall and to one another in an overlapping configuration to provide a multi-layer, three-dimensional appearance to the wall. In one embodiment of the wall system, the system includes individual panels that include a decorative front surface and a rear surface. The rear surface includes undercuts along each side of the rear surface that can be positioned over the side edges of the front surface of an adjacent wall panel. The panels may each include an adhesive layer including compressible strings therein that assist the adhesive in holding the panel on a surface by forming a vacuum between the panel and the surface to which the panel is attached.

4 Claims, 9 Drawing Sheets

Related U.S. Application Data

(60) Provisional application No. 62/944,850, filed on Dec. 6, 2019, provisional application No. 62/934,640, filed on Nov. 13, 2019, provisional application No. 62/929,510, filed on Nov. 1, 2019.

(51) Int. Cl.
*E04F 13/08* (2006.01)
*E04F 15/02* (2006.01)
*E04F 15/10* (2006.01)

(52) U.S. Cl.
CPC ...... *E04F 13/0885* (2013.01); *E04F 15/0215* (2013.01); *E04F 15/107* (2013.01); *B32B 2471/00* (2013.01); *B32B 2607/00* (2013.01)

(58) Field of Classification Search
CPC .............. E04F 13/0887; E04F 13/0866; E04F 13/0885; E04F 15/0215; E04F 15/107
USPC .......................................... 52/384, 388–391
See application file for complete search history.

(56) References Cited

U.S. PATENT DOCUMENTS

| | | | |
|---|---|---|---|
| 2,257,048 A | 9/1941 | Fullbright | |
| 2,638,430 A | 5/1953 | Mann | |
| 2,914,815 A | 12/1959 | Alexander | |
| 3,085,482 A * | 4/1963 | Yakubik | E04F 15/10 |
| | | | 52/390 |
| 3,270,473 A | 9/1966 | Smith | |
| 3,515,611 A * | 6/1970 | Brach | E04F 15/10 |
| | | | 52/390 |
| 3,535,844 A | 10/1970 | Glaros | |
| 3,730,309 A | 5/1973 | Hamann | |
| 3,866,267 A * | 2/1975 | Poletti | A47G 27/0475 |
| | | | 16/8 |
| 3,881,980 A | 5/1975 | Olson | |
| 4,003,174 A * | 1/1977 | Kotcharian | E04F 13/0887 |
| | | | 52/746.1 |
| 4,079,568 A | 3/1978 | Wortman | |
| 4,107,887 A | 8/1978 | Wendt | |
| 4,156,054 A | 5/1979 | Gurewitsch | |
| 4,242,390 A | 12/1980 | Nemeth | |
| 4,416,100 A * | 11/1983 | Troendle, Sr. | E04F 15/045 |
| | | | 52/390 |
| 4,489,115 A | 12/1984 | Layman | |
| 4,649,069 A | 3/1987 | Tone | |
| 4,694,627 A * | 9/1987 | Omholt | E04F 15/22 |
| | | | 52/390 |
| 4,766,022 A | 8/1988 | Tone | |
| 5,103,614 A | 4/1992 | Kawaguchi | |
| 5,390,720 A | 2/1995 | Colson | |
| 5,590,500 A | 1/1997 | McCue | |
| 5,673,524 A | 10/1997 | Gailey | |
| 5,747,133 A * | 5/1998 | Vinod | B32B 5/08 |
| | | | 52/390 |
| 5,891,282 A | 4/1999 | Stough | |
| 6,037,033 A | 3/2000 | Hunter | |
| 6,130,268 A * | 10/2000 | Murray | E04F 15/02155 |
| | | | 521/131 |
| 6,167,585 B1 * | 1/2001 | Fridman | E04F 21/162 |
| | | | 15/236.08 |
| 6,308,485 B1 | 10/2001 | Blumenthal | |
| 6,453,632 B1 | 9/2002 | Huang | |
| 6,698,149 B1 * | 3/2004 | Ruchgy | E04F 13/147 |
| | | | 52/309.4 |
| 6,830,041 B2 | 12/2004 | Reiber | |
| 7,121,059 B2 | 10/2006 | Pervan | |
| 7,225,591 B2 * | 6/2007 | Lin | B32B 21/00 |
| | | | 52/592.1 |
| 7,442,423 B2 * | 10/2008 | Miller | B32B 17/062 |
| | | | 52/390 |
| 7,603,824 B1 * | 10/2009 | Hartanto | E04F 15/022 |
| | | | 52/390 |
| 7,987,648 B1 | 8/2011 | Ryan | |
| 8,096,093 B1 | 1/2012 | Poon | |
| 8,191,324 B2 * | 6/2012 | Wallin | E04F 15/0215 |
| | | | 52/390 |
| 8,490,356 B2 * | 7/2013 | Taylor | E04F 15/187 |
| | | | 52/309.3 |
| 8,522,509 B2 * | 9/2013 | Tracy | E04F 15/02188 |
| | | | 52/309.3 |
| 8,898,963 B1 | 12/2014 | Amatruda | |
| 8,993,098 B2 * | 3/2015 | Masanek, Jr. | B29C 45/1676 |
| | | | 428/140 |
| 9,611,654 B2 | 4/2017 | Dao | |
| 9,617,740 B2 * | 4/2017 | Bowden | E04F 13/0885 |
| 10,024,065 B2 | 7/2018 | Balmer | |
| 10,428,533 B2 * | 10/2019 | Magnusson | E04F 13/0885 |
| 2001/0029716 A1 * | 10/2001 | Schnabel | E04F 13/16 |
| | | | 52/581 |
| 2002/0152701 A1 * | 10/2002 | Zhang | B32B 3/10 |
| | | | 52/390 |
| 2006/0162111 A1 * | 7/2006 | Miller | E04F 21/162 |
| | | | 15/235.4 |
| 2006/0174556 A1 | 8/2006 | Kornfalt | |
| 2007/0062153 A1 | 3/2007 | Li | |
| 2007/0163194 A1 * | 7/2007 | Stone | E04F 15/10 |
| | | | 156/289 |
| 2007/0245662 A1 | 10/2007 | Stanchfeld | |
| 2007/0248817 A1 * | 10/2007 | Sieber | A47G 27/0437 |
| | | | 442/151 |
| 2008/0011428 A1 * | 1/2008 | Turner | B44C 7/04 |
| | | | 156/574 |
| 2008/0138560 A1 * | 6/2008 | Windmoller | B32B 3/02 |
| | | | 428/46 |
| 2009/0107076 A1 | 4/2009 | Kim | |
| 2010/0110622 A1 | 5/2010 | Sun | |
| 2010/0205889 A1 | 8/2010 | Anderson | |
| 2010/0209671 A1 * | 8/2010 | Kato | C09J 7/38 |
| | | | 428/167 |
| 2010/0223872 A1 * | 9/2010 | Taylor | E04F 15/02188 |
| | | | 52/309.3 |
| 2010/0236171 A1 | 9/2010 | Liu | |
| 2010/0288115 A1 | 11/2010 | Pfister | |
| 2011/0003110 A1 | 1/2011 | Heartsfield | |
| 2011/0061328 A1 | 3/2011 | Sandy | |
| 2011/0111176 A1 | 5/2011 | Chu | |
| 2011/0214798 A1 * | 9/2011 | Tracy | C09J 7/38 |
| | | | 428/41.8 |
| 2011/0239572 A1 * | 10/2011 | Calapkulu | B32B 9/047 |
| | | | 52/390 |
| 2012/0096798 A1 * | 4/2012 | Ko | E04F 15/02 |
| | | | 52/578 |
| 2012/0151861 A1 | 6/2012 | Mulhair | |
| 2012/0304672 A1 | 12/2012 | Aboukhalil | |
| 2013/0047538 A1 * | 2/2013 | Taylor | E04F 15/02155 |
| | | | 52/309.3 |
| 2013/0122234 A1 | 5/2013 | Gremion | |
| 2013/0202841 A1 | 8/2013 | Kompe | |
| 2013/0255174 A1 | 10/2013 | Stafford | |
| 2014/0202626 A1 * | 7/2014 | Sennik | E04F 15/02155 |
| | | | 156/60 |
| 2014/0260061 A1 | 9/2014 | Knox | |
| 2014/0331432 A1 * | 11/2014 | Ljungstrom | B05C 17/10 |
| | | | 15/245.1 |
| 2015/0211236 A1 * | 7/2015 | Bowden | E04F 13/0885 |
| | | | 428/41.8 |
| 2015/0291852 A1 * | 10/2015 | Yamamoto | B32B 7/06 |
| | | | 428/157 |
| 2015/0376840 A1 | 12/2015 | Shih | |
| 2016/0010341 A1 | 1/2016 | Deangelis | |
| 2016/0168864 A1 * | 6/2016 | Ramachandra | B32B 37/1207 |
| | | | 52/588.1 |
| 2016/0215506 A1 * | 7/2016 | Sisler | E04F 15/02172 |
| 2016/0244978 A1 * | 8/2016 | Cheng | E04F 15/02038 |
| 2017/0198714 A1 | 7/2017 | Lin | |
| 2017/0232700 A1 * | 8/2017 | Lemieux | B32B 3/02 |
| | | | 428/71 |

(56) References Cited

U.S. PATENT DOCUMENTS

| | | | | |
|---|---|---|---|---|
| 2017/0335570 A1* | 11/2017 | Stone | ................ | E04F 13/0887 |
| 2018/0065337 A1 | 3/2018 | Grasso | | |
| 2018/0179754 A1 | 6/2018 | Karnicki | | |
| 2018/0223544 A1* | 8/2018 | Campbell | ................ | B32B 5/32 |
| 2018/0223644 A1 | 8/2018 | Campbell | | |
| 2019/0300757 A1* | 10/2019 | Rees | ................ | E04F 13/0885 |
| 2021/0054244 A1* | 2/2021 | Rees | ................ | B32B 37/08 |
| 2021/0214952 A1* | 7/2021 | Boucké | ................ | E04F 15/105 |

FOREIGN PATENT DOCUMENTS

| | | | | |
|---|---|---|---|---|
| KR | 2008007666 | 8/2008 | | |
| WO | WO-2012075427 A1 * | 6/2012 | ............ | B32B 37/02 |

\* cited by examiner

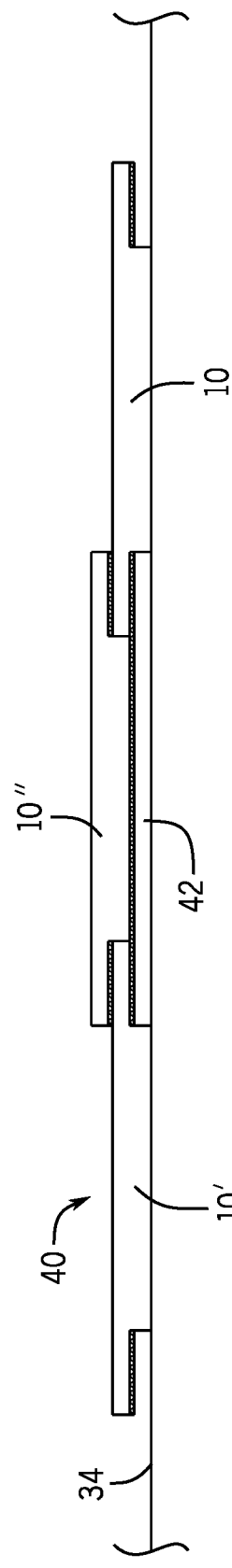
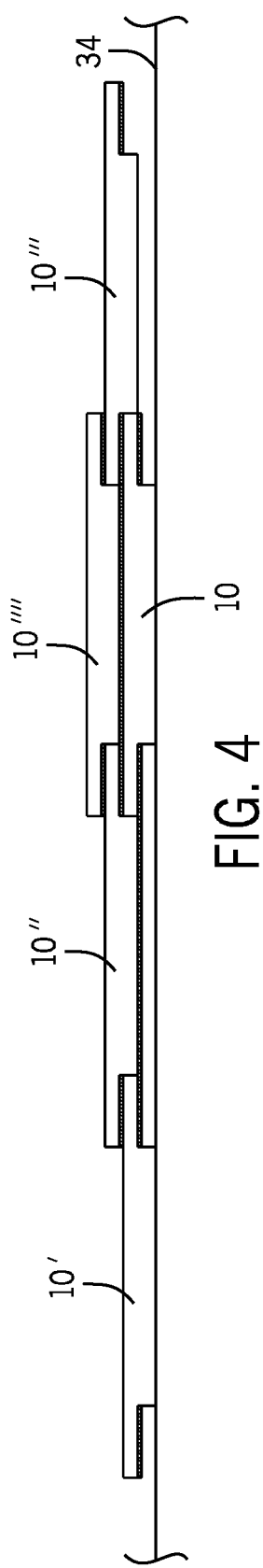
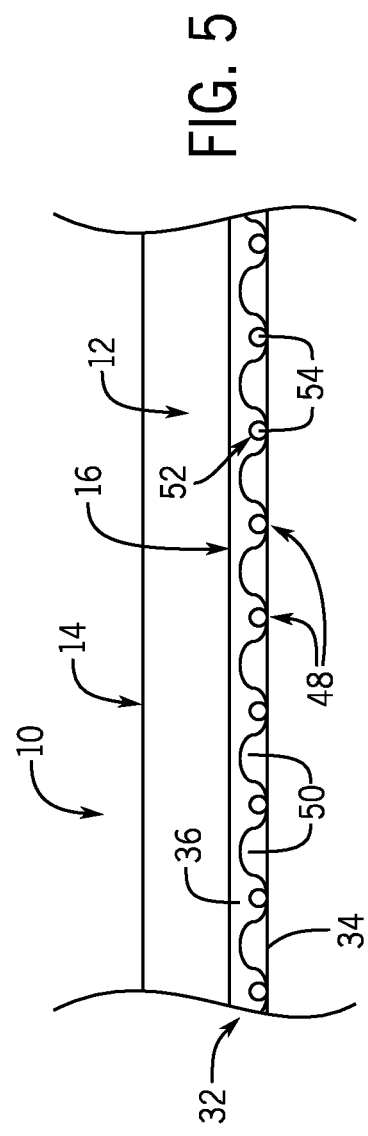

FLOOR AND WALL PANEL SYSTEM

CROSS-REFERENCE TO RELATED APPLICATIONS

The present application claims priority as a continuation-in-part from U.S. Non-Provisional patent application Ser. No. 17/086,657, filed on Nov. 2, 2020, which claims priority as a continuation-in-part from U.S. Reissue patent application Ser. No. 16/815,721, filed on Mar. 11, 2020, as well as from U.S. Provisional Patent Application Ser. No. 62/944,850, filed on Dec. 6, 2019, U.S. Provisional Patent Application Ser. No. 62/934,640, filed on Nov. 13, 2019, and U.S. Provisional Patent Application Ser. No. 62/929,510, filed Nov. 1, 2019, each of which are expressly incorporated herein by reference for all purposes.

FIELD OF THE INVENTION

The present invention relates to coverings for walls and floors, and more specifically to a system of panels for use as a wall or floor covering.

BACKGROUND OF THE INVENTION

In order to cover existing wall structures and floors to provide an aesthetically pleasing appearance, many different types of panels have been developed. While the outer/decorative surfaces of the panels can have various shapes, configurations and/or textures in order to provide the desired appearance to the walls over which the panels are positioned, prior art panels are each formed with a flat rearward surface in order to enable the panel to be positioned flush with the wall or floor surface, i.e., to provide a flat surface.

Further, in order to enable adjacent panels to be positioned in an abutting relationship with regard to each other, and thus provide a relatively seamless appearance to the panels when placed on the wall or floor, the panels include various attachment components or structures on various edges and surfaces of the panels that are engageable with one another to secure the panels to each other in this configuration.

In many embodiments, the panels are placed in abutment with one another and are affixed to the wall or floor in a suitable manner, such as by a mechanical fastener engaged through the panel and into the underlying wall or floor. In other embodiments, the engagement structure takes the form of overlapping side portions on one panel that are engaged in a suitable manner with an aligned underlapping portion on the side of an adjacent panel. In this configuration, the panels are secured to one another along their adjacent sides, such that the panels form a secure and relatively seamless structure over the wall or floor on which they are positioned.

However, with these prior art wall and/or floor panel structures, because the panels are secured to the wall or floor and/or to one another, the prior art panels are limited to having a single exposed surface formed by the panels on the wall or floor. While the single exposed surface can have multiple configurations or textures, the placement of the prior art panels on the wall in the abutting configuration limits them to a single exposed surface across each of the panels.

In addition, with particular regard to panels used to form floor surfaces, while the exposed surfaces of the panels or planks can have various shapes, configurations an textures in order to provide the desired appearance to the flooring surface over which the panels are positioned, prior art panels are normally formed with a flat lower surface in order to enable the panel to be positioned flush with the underlying flooring surface to provide a flat surface. The floor panels are placed in abutment with one another and are affixed to the floor in a suitable manner, such as by a mechanical fastener engaged between the panels and the underlying flooring surface. However, with regard to these floor panels, while the mechanical fastener enables the floor panel to be securely attached to the underlying surface, the appearance of the floor panel can be marred by the nature and position of the mechanical fastener extending through the floor panel.

In other embodiments, the panels are positioned over the flooring surface without any direct connection to the underlying flooring surface. In this configuration, the panels are secured to one another along their adjacent sides, such that the panels form a floating and relatively seamless structure over the floor on which they are positioned. However, while eliminating the need for the mechanical fastener and maintaining the seamless appearance of the panels, the lack of a securing structure between the floor panel and the underlying flooring surface allows the floor panels to shift with regard to the flooring surface. This shifting, e.g., movement in a vertical and/or horizontal direction relative to the underlying flooring surface, generates noise which is highly undesirable for the floor panels.

To combat the noise generated by the floating floor panels, many floor panels include various underlayments disposed between the assembled floor panels and the underlying flooring surface. These underlayments are often formed of resilient materials, such as rubber, that provide a flexible cushion between the floor panel and the flooring surface to dampen any noise generated by movement of the floor panels relative to the flooring surface.

Nevertheless, while the sound dampening material lessens the amount of noise generated by the floor panels, the panels still are capable of shifting or moving relative to the underlying flooring surface and one another.

In still other prior art embodiments, the floor panels are secured to the flooring surface or to the underlayment using an adhesive layer disposed on a lower surface of the floor panel. The adhesive layer is applied uniformly over the lower surface of the floor panel in order to adhere the entire floor panel to the flooring surface or underlayment. However, the adhesive layer on these peel-and-stick type floor panels does not securely hold the floor panel to the adjacent surface, such that the floor panels readily shift with respect to the flooring surface and one another.

As a result, it is desirable to develop a decorative floor panel system that enables the individual panels to be secured to the underlying flooring in a manner that allows the panels to be securely attached to the floor without marring the appearance of the panels, while also providing significant sound-dampening properties to the panels.

SUMMARY OF THE INVENTION

According to one aspect of the present disclosure, a decorative wall or floor covering system is provided that includes a number of panels that can be secured to an underlying wall or flooring surface and to one another in an overlapping configuration to provide a multi-layer, three-dimensional appearance to the wall or floor. In one embodiment of the wall or floor covering system, the system includes individual panels that include a decorative front surface and a rear surface. The rear surface includes undercuts along each side of the rear surface that can be positioned over the side edges of the front surface of an adjacent panel. Between the undercuts, the rear surface includes an adhesive for securing the rear surface of the panel to the wall/floor or to another panel to form the decorative wall or floor covering system.

According to one aspect of an exemplary embodiment of the invention, a decorative wall or flooring covering system is provided that includes a number of panels that can be secured to an underlying flooring surface or wall and to one another in an seamless, flat configuration to provide a desired appearance to the floor or wall. In one embodiment of the decorative covering system, the system includes individual panels that include a decorative upper surface and a lower surface. The lower surface includes an adhesive layer for securing the lower surface of the panel to the wall or flooring surface to form the decorative covering system. The adhesive is formed in compressible string formations constituted of the adhesive that are disposed on the lower surface, and protrude outwardly to form channels between the strings where a minimal amount of the adhesive is present. Alternatively, the adhesive is positioned over and around separately formed compressible strings disposed on the lower surface that are thicker than the adhesive layer to protrude outwardly from the adhesive layer and form channels between the strings where a minimal amount of the adhesive is present. The adhesive layer extends through and over the strings such that the strings are adhered to the flooring surface by the adhesive. However, the channels formed between the strings create a vacuum or suction force between the adhesive and the flooring surface to which the panel is secured that assists the adhesive in holding the panel on the surface. Further, the vacuum space formed by the channels additionally provides a significant sound-dampening attribute to the panels of the decorative covering system.

Numerous other aspects, features and advantages of the present invention will be made apparent from the following detailed description taken together with the drawing figures.

BRIEF DESCRIPTION OF THE DRAWING FIGURES

The drawings illustrate the best mode currently contemplated of practicing the present invention.

In the drawings:

FIG. 3 is a side plan view of a number of wall panels secured to a wall surface according to one exemplary embodiment of the invention.

FIG. 4 is a side plan view of a number of wall panels secured to a wall surface according to another exemplary embodiment of the invention.

FIG. 5 is a partially broken away, cross-sectional view of another embodiment for the wall panel of FIG. 2.

DETAILED DESCRIPTION OF THE INVENTION

Figure 1:
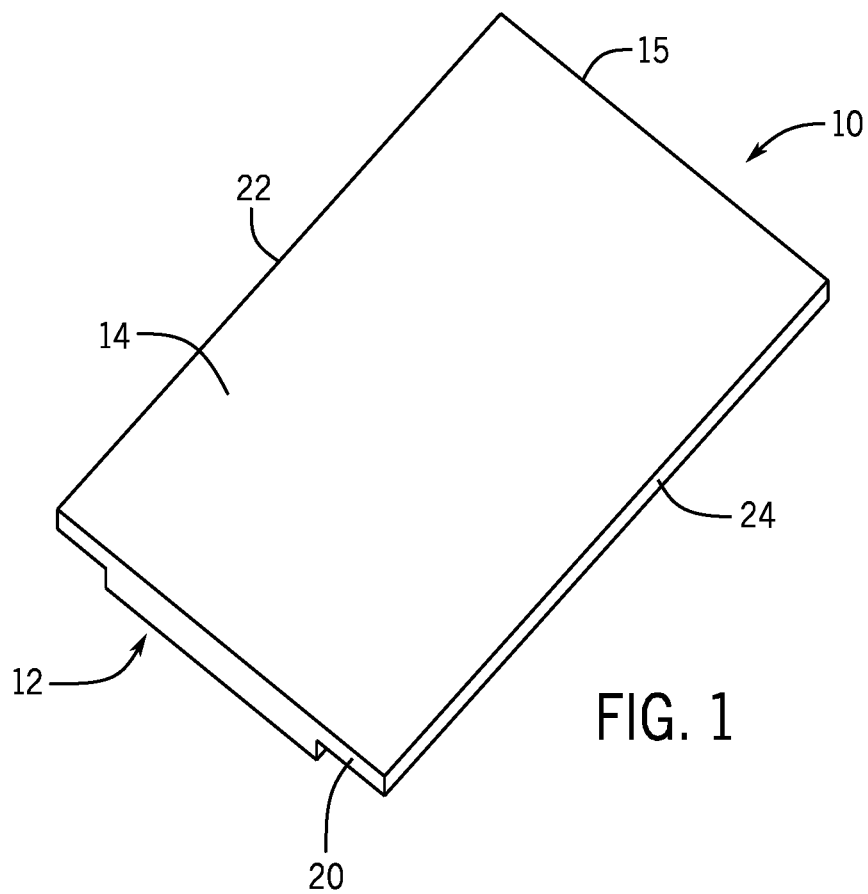
FIG. 1 is an isometric view of a wall panel according to an exemplary embodiment of the invention.

With reference now to the drawing figures in which like reference numerals designate like parts throughout the disclosure, a wall panel for use in a decorative wall or floor covering system is illustrated generally at 10 in FIG. 1. The wall panel 10 can be formed of any desired material, such as a wood material, a ceramic material a metal material, a laminate material, or any combination thereof. Each panel 10 includes a body 12 having a front surface 14 and a rear surface 16, each of the front surface 14 and the rear surface 16 bounded by a pair of opposed end edges 18,20 and a pair of side edges 22,24.

Figure 2:
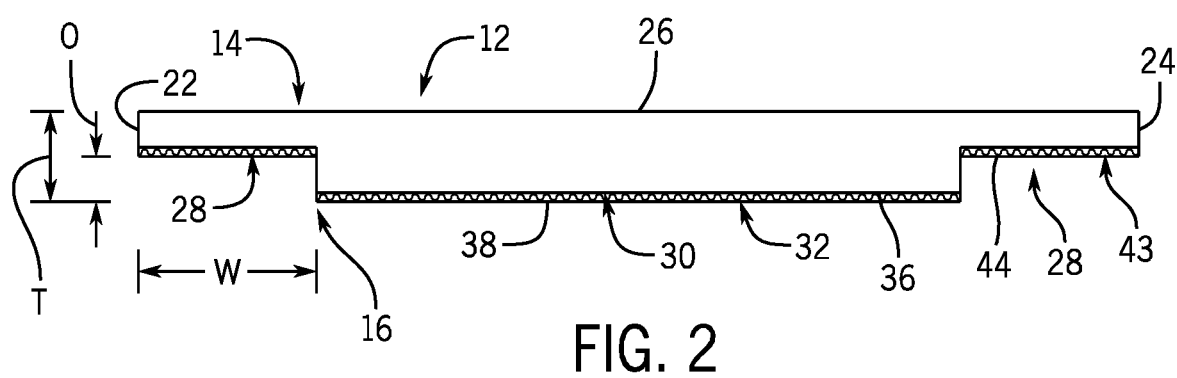
FIG. 2 is a side plan view of the wall panel of FIG. 1.

Referring now to FIG. 2, in the exemplary embodiment the front surface 14 includes a decorative layer, treatment or other material 26 thereon in order to provide the desired appearance for the wall panel 10. The decorative layer 26 extends over the side edges 22,24 in order to completely cover the exposed areas of the wall panel 10.

The rear surface 16 of the panel 10 includes a pair of recessed portions or cutouts 28 located along the side edges 22,24 of the panel 10. In the exemplary illustrated embodiment, though other lengths are also contemplated as being within the scope of the invention, the cutouts 28 extend along the entire length of the panel 10 and extend into the panel 10 from the rear surface 16 towards the front surface 14 a distance D less than the thickness T of the panel 10, such that the cutouts 28 do not affect the decorative layer 26. In one exemplary embodiment, the thickness of the cutout 28 is approximately equal to the thickness of the front surface 14 positioned over the cutouts 28. The cutouts 28 also extend into the body 12 of the panel 10 a width W.

The cutouts 28 define a central portion 30 of the rear surface 16 that includes an attachment layer 32 thereon. The attachment layer 32 can be formed in any suitable manner and of any suitable material in order to secure the central portion 30 of the rear surface 16 to a wall 34, and in an exemplary embodiment is formed of an adhesive layer 36. The adhesive layer 36 can be covered by a suitable release liner 38 to prevent premature adherence of the panel 10 to and adjacent panel 10, the wall 34 or other surface.

Looking now at FIGS. 3-4, to assemble the wall panels 10 into a wall panel system 40, initially a first panel 10 is disposed on the wall 34 by removing the release liner 38 from the adhesive 36 on the central portion 30 and pressing the adhesive 36 against the wall 34. A second panel 10' is subsequently placed on the wall 34 with the side edge 24 spaced from the side edge 22 of the first panel 10 a distance approximate to the width of the central portion 30 of the panels 10. A third panel 10" can then be placed between the first panel 10 and the second panel 10' with the central portion 30 of the third panel 10" positioned between the side edges 22 and 24 of the first panel 10 and second panel 10'. Also, the cutouts 28 of the third panel 10 rest against the side edges 22 and 24 of the first panel 10 and second panel 10', in order to provide a stacked, two layer and three-dimensional appearance to the wall panel system 40. Further, in other exemplary embodiments, the cutouts 28 can also include an attachment layer 43, such as an adhesive 44, that contacts the front surface 14 of the first and second panels 10 to secure the cutouts 28 of the third panel 10" to the first panel 10 and second panel 10'.

To assist in adhering the rear surface 16 to the wall 34 and/or another panel 10, in the exemplary embodiment of FIG. 5, the attachment surfaces or layers 32, 43 can have ridges or lines 48 formed therein. The ridges 48 extend the length of the rear surface 16 and/or the cutouts 28 and form channels 50 along the attachment layers 32, 43, with the adhesive 36,44 disposed within the channels 50 and over the ridges 48. The ridges 48 can be formed in any suitable manner on the panel 10, such as by integrally forming the rear surface 16 and/or cutouts 28 with the ridges 48, or by placing a material 52, such as a string 54 along the surface of the attachment layer 32, 43 to form the ridges 48. In this exemplary embodiment, the strings 54 can be placed on the rear surface 16 and/or cutouts 28 with the adhesive 36,44 subsequently placed over the strings 54, or the strings 54 can be placed within an adhesive layer 36,44 already present on the rear surface 16/cutout 28 to form the ridges 48. The strings 54 have a thickness greater than the thickness of the adhesive layer 36,44, such that the strings 54 protrude outwardly from the adhesive layer 54, but retain an amount of the adhesive 36,44 over the strings 54 for engagement with the wall surface 34 of the adjacent panels 10.

In any exemplary embodiment, to assist in attaching the panel 10, when pressed against the wall 34 or other panel 10, the ridges 48 contact and press the adhesive 36,44 onto the wall 34 or panel 10 to engage the adhesive 36,44 with the wall and/or panel 10. In addition, the channels 50 formed by the ridges 48 create suction or a localized vacuum between the adhesive 36,44 within the channels 50 and the wall 34 or panel 10 which assists in holding the panels 10 in position. While not wishing to be bound by any particular theory, this suction is believed to be created in the channels 50 between the panel 10 and the wall 32 by the compression of the strings 54 against the wall 32. This compression effectively seals off the channels 50 from the one another and from the periphery of the panel 10, as the adhesive 36,44 placed along the periphery of the panel 10 securely engages the wall 32 and/or adjacent panel 10 to prevent material from being disposed between the panel 10 and the wall 32 other than the adhesive 36,44 and the strings 54. As such, the air within the channels 50 upon initial pressing of the panel 10 against the wall 32 and/or another panel 10 can be pressed out of the channels 50 past the adhesive 36,44 as the strings 54 are compressed against the panel 10 and/or wall 10. As the strings 54 are compressed further during pressing of the panel 10 against the adjacent panel 10 and/or wall 32, the air becomes exhausted from within the channels 50 as the adhesive 36,44 along the periphery of the panel 10 is engaged with the adjacent panel 10 and/or wall 32. Subsequently, when pressure on the panel 10 is released the strings 54 expand concurrently enlarging the channels 50 between the strings 54. However, due to the lack of air within the channels 50 as air cannot be reintroduced into the channels 50 through the adhesive 36,44 engaged with the adjacent panel 10 and/or wall 32, the expansion of the strings 54 enlarging the channels 50 creates a vacuum in the channels 50 which acts to provide suction between the panels 10 and the adjacent panel 10 and/or wall 32, thereby assisting in holding the panel 10 in secure engagement with the adjacent panel 10 and/or wall 32.

In other alternative exemplary embodiments, as shown in FIG. 4, a fourth panel 10''' can be placed over the opposite side edge 24 of the first panel 10, to define a space 42 over the first panel 10 between the third panel 10" and fourth panel 10'''. In this embodiment, the space 42 corresponds to the size of the central portion 30 of each of the panels 10, such that a fifth panel 10'''' can be positioned within the space 42 between the third panel 10" and fourth panel 10'''. The fifth panel 10'''' can also be configured to have a length shorter than other panels 10, 10', 10", 10''' in the system 40, such that the fifth panel 10'''' allows a portion of the first panel 10 to be seen, thus forming a stacked, three layer and three-dimensional configuration for the wall system 40.

Figure 6:
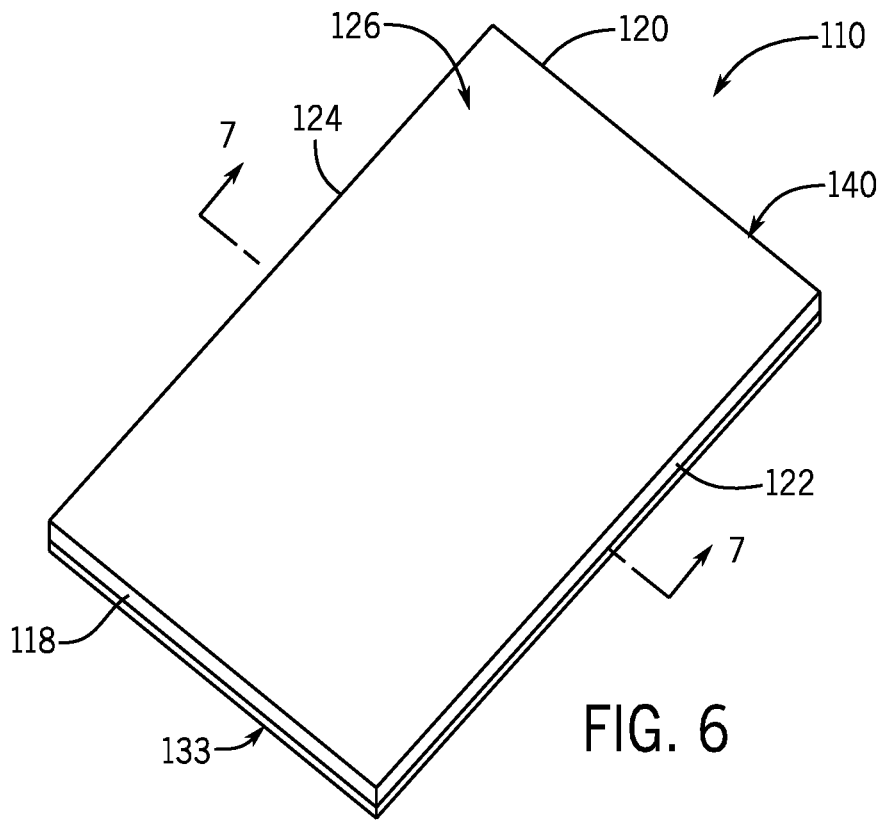
FIG. 6 is an isometric view of a floor panel according to an exemplary embodiment of the invention.

With reference now to FIG. 6, a floor panel 110 can be formed of any desired material, such as a wood material, a ceramic material a metal material, a laminate material, or any combination thereof. Each panel 110 includes a body 112 having an upper surface 114 and a lower surface 116, each of the upper surface 114 and the lower surface 116 bounded by a pair of opposed end edges 118,120 and a pair of side edges 122,124.

Figure 7:
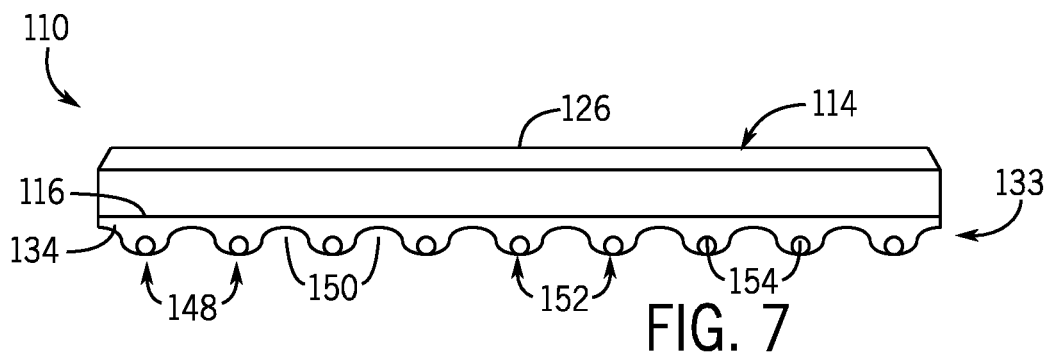
FIG. 7 is a cross-sectional view of the floor panel along line 7-7 of FIG. 6 in an unassembled configuration.
Figure 8:
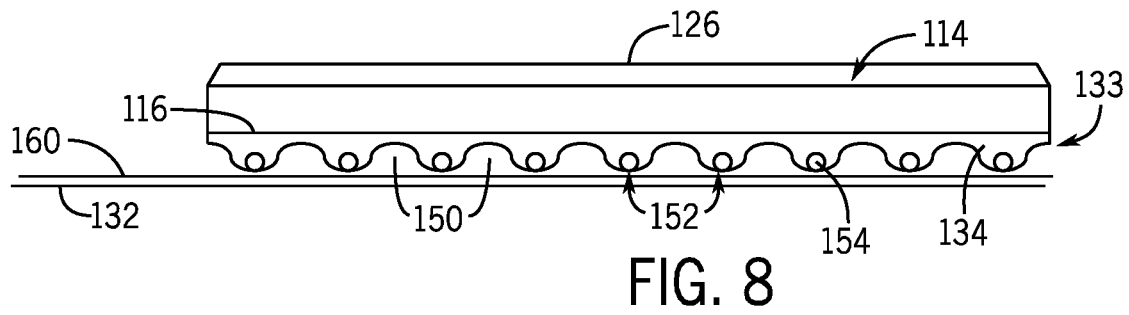
FIG. 8 is a cross-sectional view of the floor panel of FIG. 7 in an assembled configuration.

Referring now to FIG. 7, in the exemplary embodiment the upper surface 114 includes a decorative layer, treatment or other material 126 thereon in order to provide the desired appearance for the floor panel 110. The decorative layer 126 extends to be coextensive with the end edges 118,120 and the side edges 122,124 in order to completely cover the exposed areas of the floor panel 110. The end edges 118,120 and/or side edges 122,124 of abutting panels 110 can additionally be secured to one another through the use of a mechanical fastener (not shown), such as any of the well known types of mechanical interlocking fasteners for flooring panels in the prior art, positioned on one or both of the adjacent panels 110, in order to maintain the position of the panels 110 relative to one another.

To assist in adhering the lower surface 116 to the flooring surface 132 on which the panel 110 is positioned, in the exemplary embodiment of FIG. 7, the lower surface 116 includes an attachment layer 133, such as an adhesive layer 134 extending across the lower surface 116. The adhesive layer 134 can be formed of any suitable adhesive for attaching the material forming the panel 110 to the flooring surface 132 on which the panel 110 is positioned.

Referring now to FIGS. 7-10, the adhesive layer 134 includes a number of ridges or lines 148 formed therein. The ridges 148 generally extend over the length (FIG. 9) and/or the width (FIG. 10) of the lower surface 116 and form channels 150 along and/or within the adhesive layer 134. The adhesive layer 134 in one embodiment is disposed within the channels 150 and over the ridges 148, but in alternative embodiments can be positioned only over the ridges 148. The ridges 148 can be formed in any suitable manner on the panel 110, such as by integrally forming the lower surface 116 with excess material to form the ridges 148. In one alternative exemplary embodiment, the ridges 148 are formed by placing a material 152, such as a string 154, along the lower surface 116 to form the ridges 148. In this exemplary embodiment, the strings 154 can be placed on the lower surface 116 with the adhesive layer 134 subsequently placed over the strings 154, or the strings 154 can be placed within an adhesive layer 134 already present on the lower surface 116 to form the ridges 148. The strings 154 can have a thickness greater than the thickness of the adhesive layer 134, such that the strings 154 protrude outwardly from the adhesive layer 134, or the strings 154 can be completely enclosed within the adhesive layer 134. The strings 154 can be formed of any suitable and flexible material, such as a natural or synthetic fabric material, or a flexible plastic or rubber material, that is separate from the adhesive layer 134. Alternatively, the strings 154 can be formed of or as a part of the adhesive layer 134, where which the adhesive layer 134 is applied in a desired manner to form the strings 154 at desired locations on the lower surface 116. In one exemplary embodiment, the strings 154 are formed of a material capable of retain an amount of the adhesive 134 within and/or over the strings 154 or engagement with the flooring surface 132. In addition, the lower surface 116 can include a peripheral ridge 156 disposed around the border or periphery of the panel 110, and which can be formed with a string 154 and/or the adhesive layer 134 in any of the manner described previously.

Figure 9:
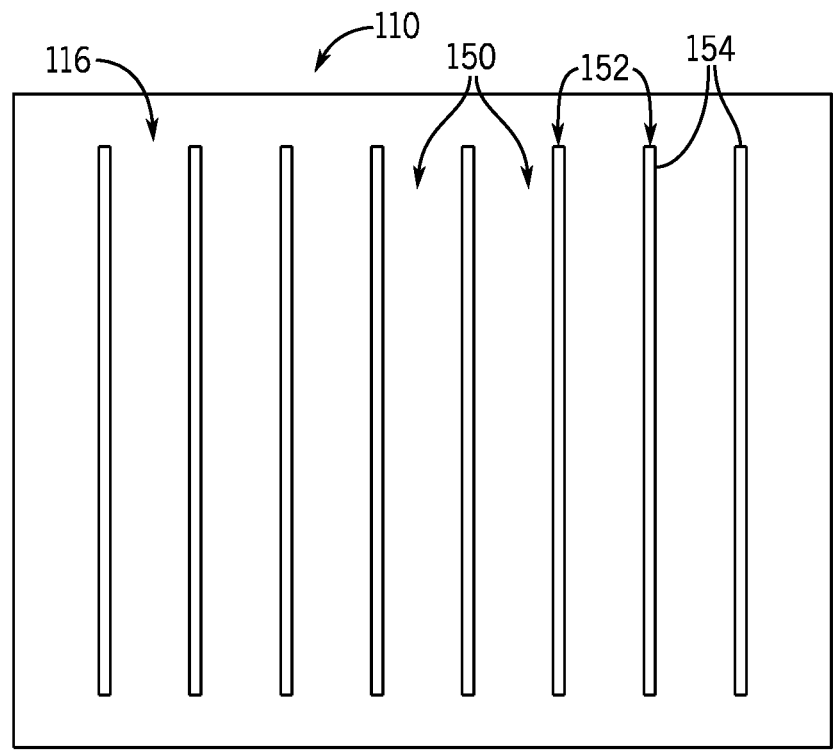
FIG. 9 is a bottom plan view of the floor panel of FIG. 6.
Figure 10:
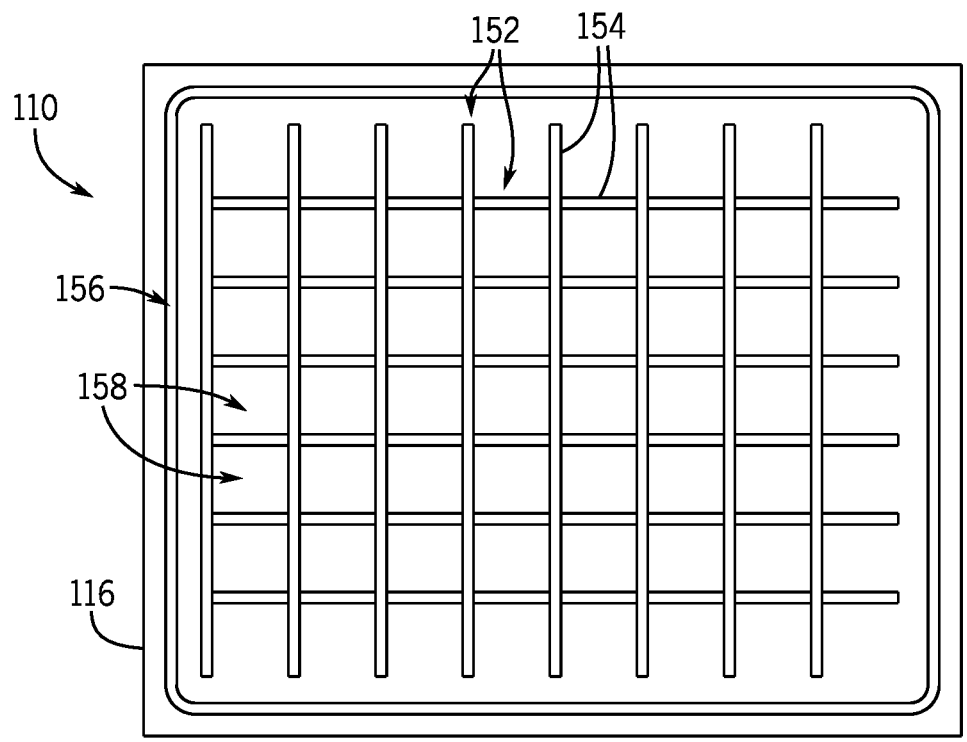
FIG. 10 is a bottom plan view of a floor panel according to another exemplary embodiment of the present disclosure.
Figure 11:
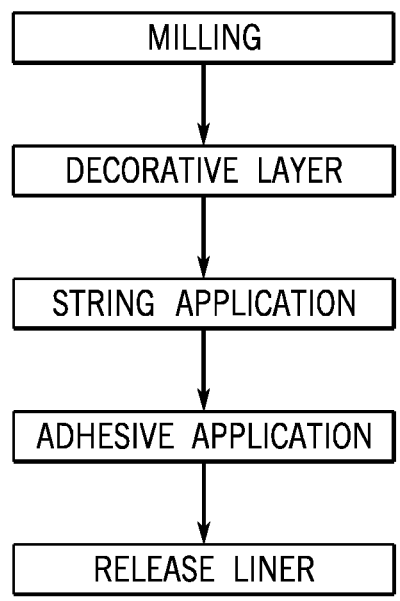
FIG. 11 is a perspective view of an applicator utilized in a method of forming the floor panel according to an exemplary embodiment of the disclosure.

In any exemplary embodiment, to assist in attaching the panel 110 when pressed against the flooring surface 132, the ridges 148 contact and press the adhesive 134 on the ridges 148 onto the flooring surface 132 to engage the adhesive 134 with the flooring surface 132. In addition, the channels 150 formed by the ridges 148 create suction or a localized vacuum between the adhesive 134 within the channels 150 and the flooring surface 132 which assists in holding the panels 110 in position. While not wishing to be bound by any particular theory, this suction is believed to be created in the channels 150 between the panel 110 and the flooring surface 132 by the compression of the ridges 148/strings 54 against the flooring surface 132. This compression effectively seals off the channels 150 from one another and from the periphery of the panel 110, as air within the channels 150 is forced out of the channels 150 due to the pressing of the panel 110 against the flooring surface 132. The engagement of the adhesive 134 adjacent the ends of the ridges 148 and/or the peripheral ridge 156 prevents additional air from entering the channels 150 such that the adhering suction is maintained within the channels 150. The adhesive 134 placed on the ridge 156 along the periphery of the panel 110 securely engages the flooring surface 132 to prevent material from being disposed between the panel 110 and the flooring surface 132 other than the adhesive 134 and the ridges 148/strings 154. As such, the air within the channels 150, upon initial pressing of the panel 110 against the flooring surface 132, can be pressed out of the channels 150 past the adhesive 134 as the ridges 148/strings 154 are compressed between the panel 110 and/or flooring surface 132. As the ridges 148/strings 154 are compressed further during pressing of the panel 110 against the flooring surface 132, the air becomes exhausted from within the channels 150 as the adhesive 134 at the ends of the ridges 148/strings 154 and/or along the periphery of the panel 110 is engaged with the flooring surface 132. Subsequently, when pressure on the panel 110 is released, the ridges 148/strings 154 expand concurrently enlarging the channels 150 between the ridges 148/strings 154. However, due to the lack of air within the channels 150 and the sealing off of the channels 150 by the adhesive 134 adjacent the ends of the channels 150 and/or the peripheral ridge 156, air cannot be reintroduced into the channels 150 through the adhesive 134 engaged with the adjacent flooring surface 132. Therefore, the expansion of the ridges 148/strings 154 and consequent expansion of the channels 150 creates a vacuum within the channels 150 which acts to provide suction between the panels 110 and the flooring surface 132, thereby assisting the adhesive 134 in holding the panel 110 in secure engagement with the flooring surface 132. In the embodiment of FIG. 9, the channels 150 are replaced by pockets 158 that are closed off from one another when the panel 110 is engaged with the flooring surface 132. These pockets 158 can enhance the adhesion and sound dampening of the panel 110.

In addition, the vacuum formed in each of the respective channels 150 provides significant sound attenuation by providing a barrier to the transmission of sound waves from the between the flooring surface 132 and the panel 110.

In another exemplary embodiment of the disclosure, prior to the application of the floor panels 110 to the flooring surface 132, a membrane and/or primer 160 (FIG. 8) is applied to the flooring surface 132. The membrane or primer 160 is layer of material capable of enhancing the adhesion of the adhesive layer 134 to the flooring surface 132 to increase the strength of the vacuum bonding provided by the channels 150 and/or pockets 158. In one particular exemplary embodiment, the membrane/primer 160 is a liquid material, such as DURAPRO® waterproofing membrane sold by MULTIBOND, Inc. of Quebec, Canada. The membrane 160 provides the flooring surface 132 with increased smoothness and uniformity to enable the channels 150 and/or pockets 158 to more securely engages the flooring surface 132/membrane 160.

Figure 12:
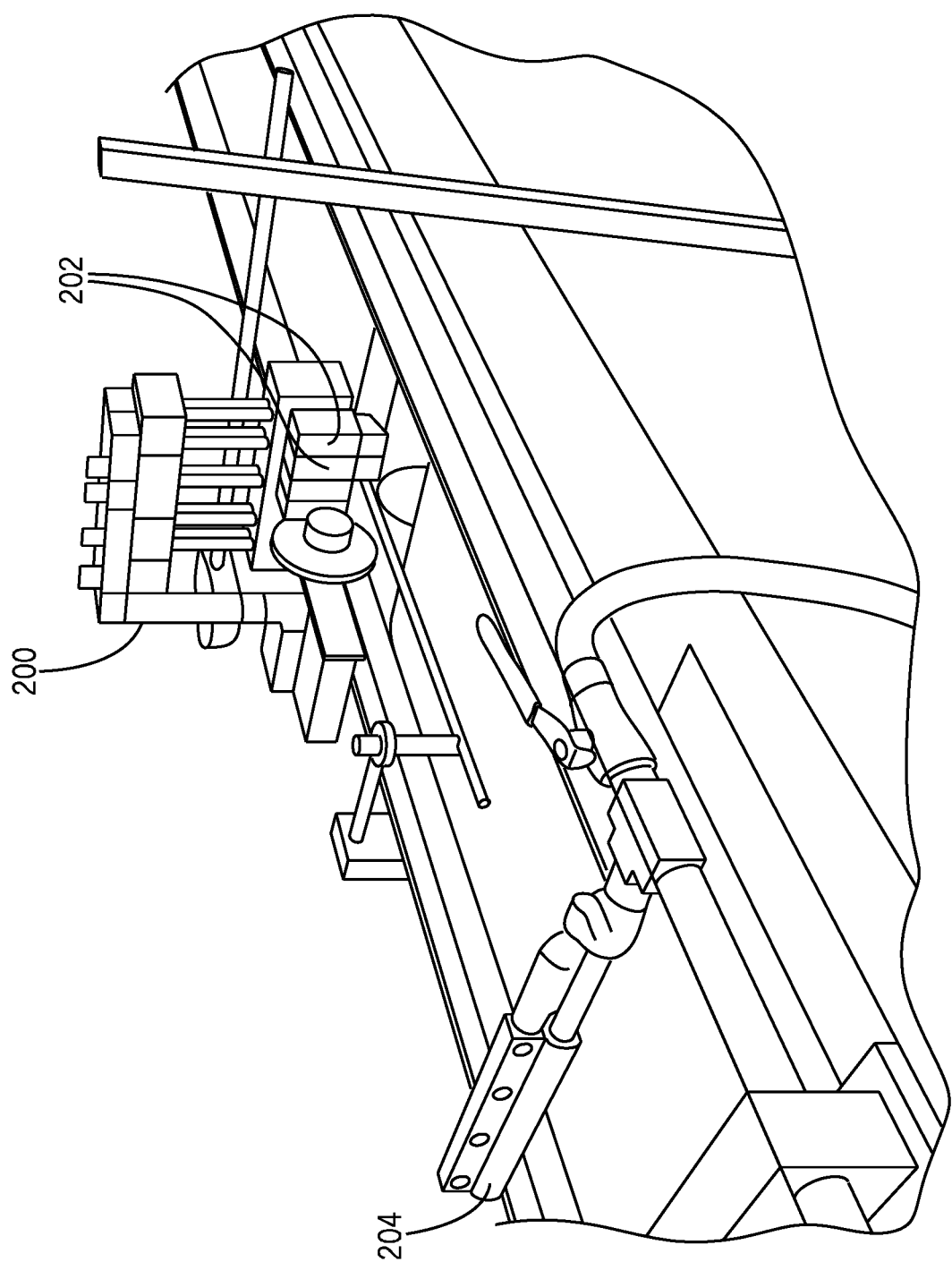
FIG. 12 is a flowchart showing the steps of the method of forming the floor panel according to an exemplary embodiment of the disclosure.
Figure 13:
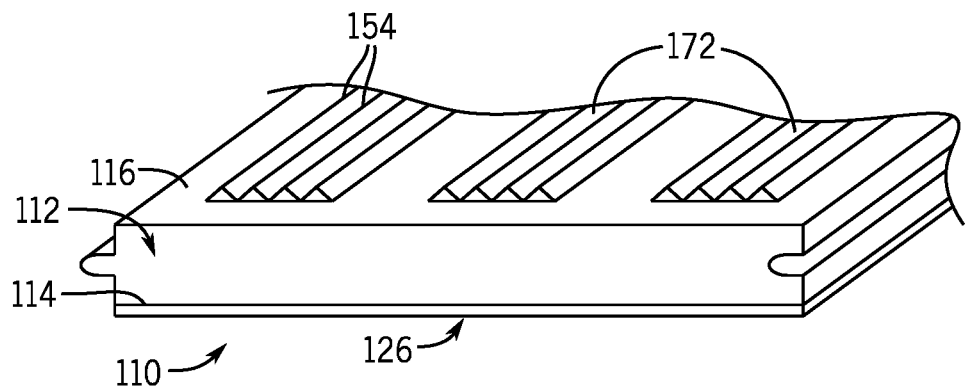
FIG. 13 is a cross-sectional view of a floor panel constructed according to another exemplary embodiment of the present disclosure.

Further, in another exemplary embodiment of the disclosure, a method for assembling the floor panel 110 over the flooring surface 132 is illustrated in FIG. 12. In an initial step 100, the floor panel or board 110 is fabricated in a known manner in order to provide the panel 110 with the desired shape and size, such as by cutting, milling or otherwise shaping the material forming the panel 110 into the desired configuration. In a subsequent step 102, a decorative layer 126 is applied to the upper surface 114 of the panel 110. The decorative layer 126 can be formed by applying a suitable material, such as a stain (not shown), or by applying a layer of a decorative material, such as a veneer (not shown), to the upper surface 114 of the panel 110 to form the decorative layer 126.

After application of the decorative layer 126, in step 104 the attachment layer 133/adhesive layer 134/ridges 148 and/or strings 154 are applied to the lower surface 116 of the panel 110. In a particular exemplary embodiment of the panel 110 and method of the disclosure, the adhesive layer 134/material 152 forming the ridges 148/strings 154 is applied to the lower surface 116 by running the lower surface beneath an applicator 200 (FIG. 12) having a number of nozzles 202 spaced from one another across the width of the panel 110. As a panel 110 passes beneath the applicator 200, the nozzles 202 distribute the material 152 onto the lower surface 116 of the panel 110 in the desired configuration. After application of the material 152, in step 106 the adhesive layer 134 is applied over the material 152 and the entire area of the lower surface 116, such as by a spreader 204 (FIG. 12) to provide the adhesion of the panel 110 to the flooring surface 132 and/or membrane 160, and to form the channels 150 and/or pockets 158 thereon. Following the application of the adhesive layer 134, in step 108 a release liner 162 is placed over the adhesive layer 134 and strings 154 to prevent inadvertent contact with the adhesive layer 134 until being removed prior to application of the panel 110 to the flooring surface 132.

Figure 14:
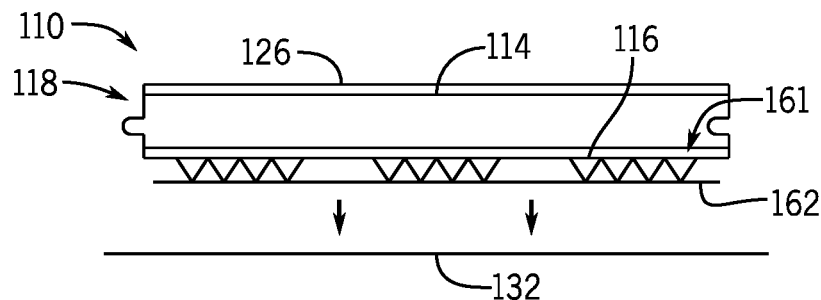
FIG. 14 is a cross-sectional view showing a first step of the application of the floor panel of FIG. 13 to a flooring surface.

In still other alternative embodiments, as shown in FIG. 14, a carrier or backing layer 161 can be applied to the lower surface 116 between the body 112 and the attachment layer 133 and/or adhesive layer 134. The carrier layer 161 is formed form a resilient material, such as a rubber material, to provide a shock absorbing property to the panel 110, as well as to enhance the sound dampening properties provided by the attachment layer 133. The carrier layer 161 can be applied to the lower surface 116 in any suitable manner, such as by using a roller coater (not shown) to apply the carrier layer 161 to the lower surface 116 prior to the application of the attachment layer 133, as shown in the exemplary embodiment of FIG. 12.

In an alternative embodiment where the material 152 forming the strings 154 is an adhesive, a separate and different adhesive can be used to form the adhesive layer 134 disposed over the strings 154, or the adhesive layer 134 can be omitted from the lower surface 116 entirely.

Looking now at the exemplary embodiments of FIGS. 13-16, the floor panel 110 includes the body 112 having an upper surface 114 and a lower surface 116, each of the upper surface 114 and the lower surface 116, with the upper surface 114 including a decorative layer 126 to completely cover the exposed areas of the floor panel 110. Opposite the decorative layer 126, the panel 110 includes a number of ridges 148/strings 154 disposed on the lower surface 114. The strings 154 are generally triangular in shape, with the wide end secured to the lower surface 114 and the narrow end spaced from the lower end 114. The strings 154 are formed of an adhesive material, with or without a separate adhesive layer 134 thereon, and defines spaces 170 between the ridges 148/strings 154. The strings 154 extend at least substantially the length of the body 112 between opposed ends 118,120 of the body 112. The ridges 148/strings 154 can be positioned in any manner on the lower surface 116, such as in the separate, spaced groups 172 shown in FIG. 13.

Figure 15:
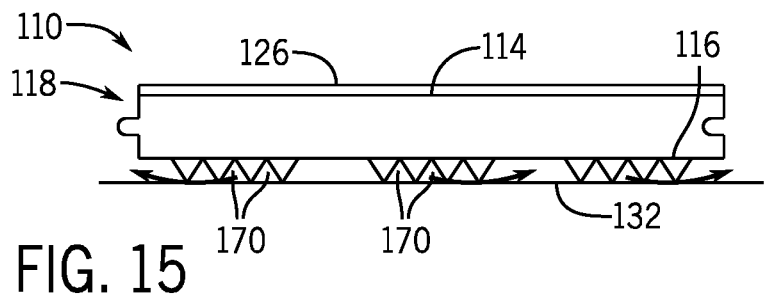
FIG. 15 is a cross-sectional view of a second step of the application of the floor panel of FIG. 13 to a flooring surface.
Figure 16:
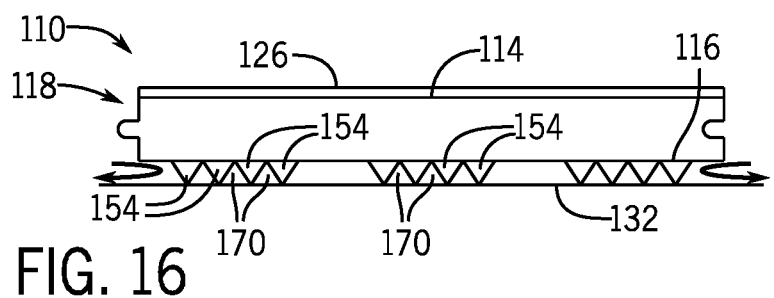
FIG. 16 is a cross-sectional view of a third step of the application of the floor panel of FIG. 13 to a flooring surface.

Looking now at FIGS. 14-16, initially the liner 162 (FIG. 14) is removed from its position over the ridges 148/strings 154 and the panel 110 is pressed onto the flooring surface 132 in FIG. 15. As the panel 110 is pressed onto the surface 132, the strings 154 are compressed, which presses the air present within the spaces 170 out of the spaces 170. After pressing, the pressure on the panel 110 released, such that the elastic nature of the ridges 148/strings 154 causes the strings 154 to rebound towards their uncompressed configuration. However, due to the adhesive nature of the material 152 forming the strings 154, or the adhesive 134 positioned over the ridges 148/strings 154, portions of the ridges 148/strings 154, such as the tip of the triangular ridges 148/strings 154, remains adhesively attached to the flooring surface 132. This adherence prevents air from being able to be reintroduced into the spaces 170, such that a vacuum is formed within the spaces 170 that co-acts with the adhesive properties of the adhesive 134/ridges 148/strings 154 to securely hold the panel 110 on the flooring surface 132 in manner stronger than possible by the adherence of the ridges 148/strings 54 to the flooring surface 132 alone.

In still a further embodiment, the panel 110 can be formed to be flexible, such as a panel 110 having a body 112 formed of a fabric material, such as a carpet material or similar structure.

Figure 17:
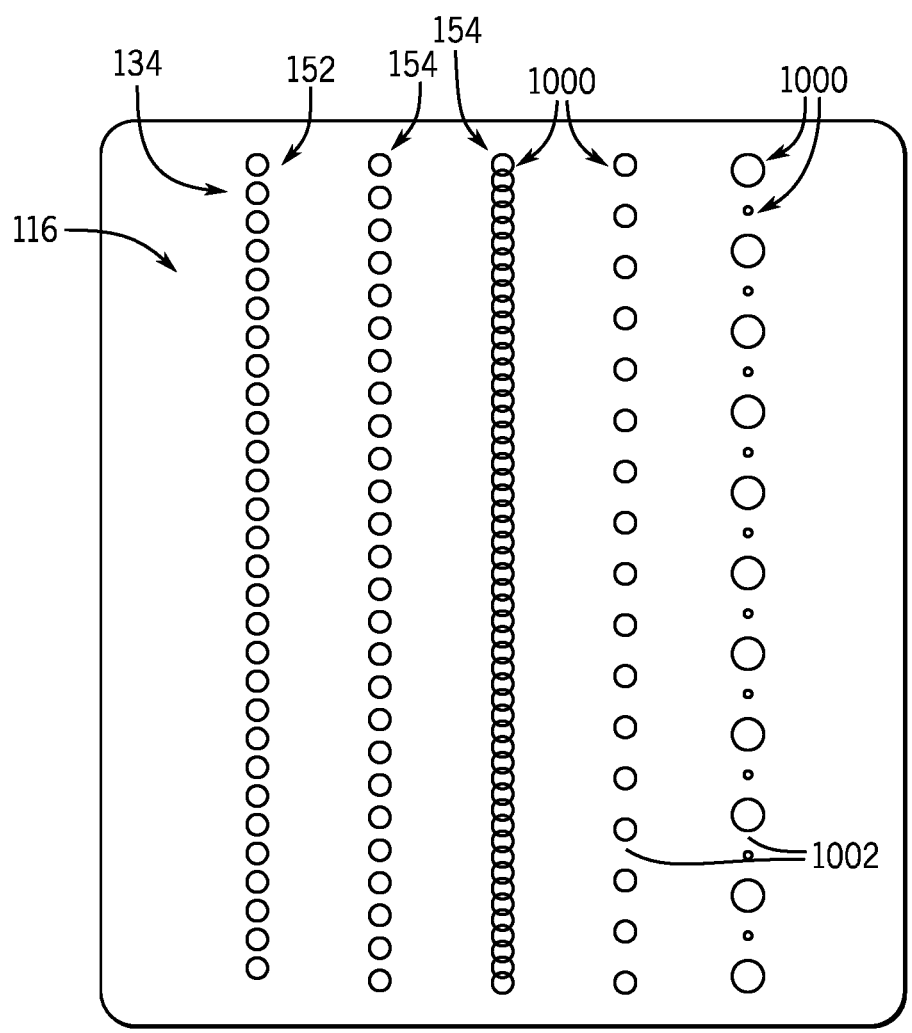
FIG. 17 is a bottom isometric view of a floor panel versions constructed according to still other exemplary embodiments of the present disclosure.

In still another embodiment of the present disclosure, as best shown in FIG. 17, the ridges 148/strings 154 and other portions of the material 152 can be formed with dots 1000 of the material 152 positioned on the lower surface 116. The dots 1000 can be formed of any suitable adhesive for forming the ridges 148/strings 154 and/or other portions of the adhesive layer 134 around the ridges 148/strings 154. The dots 1000 can be applied in any suitable manner, such as by using a nozzle (not shown) to direct the material 152 forming the dots 1000 onto the lower surface 116, among other suitable methods. Additionally, the dots 1000 can be positioned on the lower surface 116 in any desired configuration, such as in a configuration defining spaces 1002 between adjacent dots 1000, in a configuration where the dots 1000 at least partially overlap one another, in a configuration where the dots 1000 are formed with different sizes, or any combination thereof, among other suitable configurations. Upon application of the panel 110 including the dots 1000 to the flooring surface 132, in one exemplary embodiment the material 152 forming the dots 1000 can spread, such that the dots 1000 are at least partially deformed or displaced to form a generally continuous line of material 152 to form the ridges 148/strings 154 and provide the vacuum seal around the spaces 170 defined by the dots 1000/ridges 148/strings 154 to increase the adherence of the panel 110 to the flooring surface 132.

Figure 18:
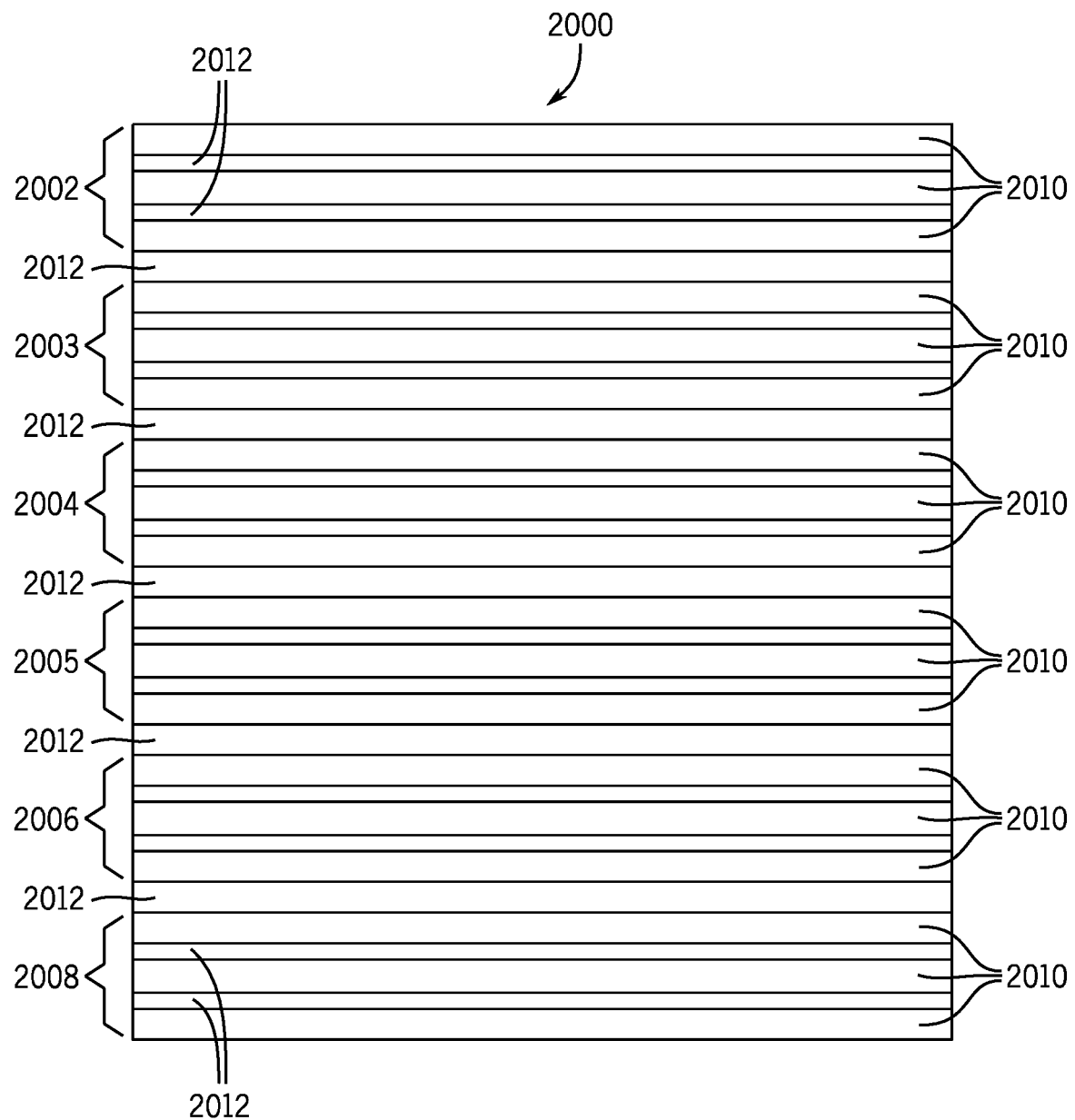
FIG. 18 is a schematic view of a wall or floor panel constructed according to another exemplary embodiment of the present disclosure.

Looking now at FIG. 18, the panel 2000 is formed with a number of layers 2002,2003,2004,2005,2006,2008. Each layer 2002-2008 includes a number of individual sheets 2010 of the desired material for the layers 2002-2008 and the panel 2000, which can be the same or different from one another, and can be formed from wood, plastic, or any other suitable material for use in a flooring or wall panel. Alternatively, the layers 2002-2008 can be individually formed from a single sheet 2010, or varying numbers of sheets 2010 in the different layers 2002-2008, as desired. The layers 2002-2008 can also be positioned in a stacked configuration relative to one another or can be at least partially offset from one another to form the panel 2000, as desired.

The individual sheets 2010 forming the layers 2002-2008 are secured to one another using a suitable adhesive in order to retain the layer in connection with one another to form the panel 2000. In certain exemplary embodiments, the layers 2002-2008, and optionally the individual sheets 2010 of the layers 2002-2008 are secured to one another using temperature sensitive adhesives 2012. These temperature sensitive adhesives 2012 can change in accordance with the temperature and other conditions of the environment (e.g., humidity) around the adhesive 2012, e.g., the adhesive 2012 can soften and become more elastic upon reaching a specific temperature, thus enabling the adhesive 2012 to shift along with the layers 2002-2008 and individual sheets 2010 forming the layers 2010 as they expand and contract with regard to changes in temperature and other environmental conditions in which the panel 2000 is utilized. As such, the panel 2000 formed with the different layers 2002-2008 of individual sheets 2010 forming the layers 2002-2008 in conjunction with the temperature sensitive adhesive 2012 significantly lessens the negative effects of significant temperature changes on the integrity of the panels 2000, thereby enabling the panel 2000 to be utilized in outdoor environments, such as siding, decking, or other exterior building construction covering materials.

In addition, in certain embodiments the layers 2002-2008 can be affixed to one another to form the panel 2000 using a similar temperature sensitive adhesive 2012 to accommodate for the particular environment that the panel 2000 is to be used in, i.e., a hot environment or a cold environment. In other alternative embodiments, the individual layers 2002-2008 can be formed using different temperature sensitive adhesives 2012 between the sheets 2010, and/or to secure individual layers 2002-2008 to one another to form panels 2000 capable of accommodating larger temperature ranges in outdoor environments that can be either hot or cold.

Various alternative embodiments are also contemplated as being within the scope of the following claims, particularly pointing out and distinctly claiming the subject matter regarded as the invention.

We claim:

1. A wall or floor panel for attachment to a surface, the panel comprising:
   a. a body with an upper surface and a lower surface, the body including a number of layers secured to one another to form the body, the layers secured to one another using a temperature sensitive adhesive; and
   b. at least one attachment layer disposed on the lower surface, wherein the attachment layer includes a number of ridges therein that define vacuum channels therebetween when positioned on the surface, the number of ridges and vacuum channels therebetween are formed in separate groups spaced form one another on the lower surface,
   wherein the layers are formed of individual sheets and the temperature sensitive adhesive is applied between adjacent sheets of each layer, and
   wherein the temperature sensitive adhesive securing individual sheets of the number of sheets to one another is a combination of a heat sensitive adhesive and a cold sensitive adhesive.

2. The wall or floor panel of claim 1 wherein the temperature sensitive adhesive is applied between adjacent layers of the body.

3. The wall or floor panel of claim 1 wherein the layers are formed of individual sheets and the temperature sensitive adhesive is applied between adjacent sheets of each layer.

4. A method of forming a floor or wall panel, the method comprising the steps of:
   a. securing a number of layers of a material to one another using a temperature sensitive adhesive to form a body with an upper surface and a lower surface;
   b. applying a decorative layer to the upper surface; and
   c. applying an attachment layer to the lower surface, wherein the attachment layer includes a number of ridges therein that define vacuum channels therebetween, the number of ridges and vacuum channels therebetween are formed in separate groups spaced form one another on the lower surface,
   wherein the step of securing the number of layers to one another comprises:
   a. providing a number of sheets of the material;
   b. securing the number of sheets to one another using the temperature sensitive adhesive to form the number of layers; and
   c. securing the layers to one another to form the body,
   wherein the temperature sensitive adhesive securing the number of sheets to one another and the number of layers to one another is a combination of a heat sensitive adhesive and a cold sensitive adhesive.

* * * * *